UNITED STATES PATENT OFFICE.

THEODOR SETH WENNAGEL, OF HAMBURG, GERMANY.

MANUFACTURE OF ELASTIC PLASTIC MASSES.

1,107,003.　　　Specification of Letters Patent.　　Patented Aug. 11, 1914.

No Drawing.　　Application filed June 3, 1912. Serial No. 701,314.

*To all whom it may concern:*

Be it known that I, THEODOR SETH WENNAGEL, a subject of the King of Wurttemberg, residing at 1 Barmbeckerstrasse, Hamburg 39, Germany, have invented certain new and useful Improvements in the Manufacture of Elastic Plastic Masses; and I do hereby declare the following to be a full, clear, and exact description of the invention.

My invention relates to the manufacture of elastic, plastic masses.

It is well known that ketones and aldehydes, particularly the latter, readily polymerize and condense, and not only among themselves but also in combination with the most various bodies of inorganic or organic nature. This property has heretofore been used for making new valuable compounds of many kinds. Particularly the lowest members of the two series, formaldehyde and acetone, have been employed in many ways for the mentioned purpose. Recently some processes have been disclosed of making ebonite-like masses by using formaldehyde as a condensation agent, *e. g.* from phenol. Various defects are, however, attached to these processes. The products obtained in this way are inferior to ebonite, for example, in elasticity.

Now a primary object of my invention is to produce a plastic mass to which such defects are not attached.

By means of many experiments I have found that hydroxy derivatives of aromatic bodies, such as phenol and the higher molecular cyclic compounds, as cresol and naphthol, react with soaps, either resin soaps or fat soaps, as resinate, stearate, palimitate and oleate of potassium, sodium, aluminum, calcium and other metals, and the product reacts with aldehydes to produce condensation products that are superior to the condensation products of pure phenols and aldehydes. The quantity of soap used must be considerable, the minimum being more than one-fifth of the equimolecular quantity of the hydroxy derivatives of the aromatic bodies used, *i. e.* the phenolic body or its homologues. The aldehydes can wholly or partially be replaced by ketones or their homologues such as aldoses or ketoses of the sugar group, &c. These new products have considerably more elasticity than the similar bodies previously referred to, but also are less expensive, as the starting materials are cheaper, and the condensation product is obtained in one operation in a state ready for casting or molding. Likewise, these condensation products are able to absorb relatively large quantities of substances generally known as adhesive substances allied to gums of which sugar and cellulose are types and the albuminous bodies as glue gelatin and the like are another type. When these products absorb relatively large quantities of cellulose and after the water of condensation has been driven off a flexible, plastic mass very similar to celluloid is obtained.

If albuminous bodies, *e. g.* glue, gelatin and the like, are added to the mass before the condensation, after the vaporization of the water of condensation a product very similar to horn is obtained.

All the hereindescribed products stand temperatures up to 200° C. without changing, while at higher temperatures they are slowly decomposed without melting.

My process may be carried into practice as follows:

The soaps are first added in the correct proportion to the aromatic body, and heated on the open fire or by steam until the reaction takes place which is somewhat violent and lasts for about twenty minutes. This liquid I will designate *a*. The aldehyde is then slowly added and kept boiling until the mass begins to thicken.

1. The liquid *a* may be prepared in large quantities and cooled. In this event the components, liquid *a* and formaldehyde, are put simultaneously into a preferably closable vessel or boiler and heated to about 95° C. until the reaction occurs. In order to prevent the liquid boiling over during the reaction, which lasts about an hour, the heating is diminished or entirely stopped, because the heat of reaction generally suffices to continue the reaction to the end.

After the termination of the reaction the mass is kept boiling until it begins to thicken, whereupon it is poured into molds. The filled molds are taken into the drying-chamber where the drying is begun at a temperature of 30–40° C. which is gradually increased to 150° C. This drying of the mass is finished after about four days, or I may proceed as follows:—

2. The components, liquid *a* and aldehyde, are simultaneously put into the molds and heated in an autoclave to about 150–170° C., so that a pressure of about 6–8 atmospheres is produced. After being subjected for twenty-four hours to this temperature and pressure the mass is finished.

For obtaining ebonite-like masses having the above-mentioned advantages the following proportions in parts by weight of formaldehyde of 40% have proved satisfactory:—

No. 1. 33 phenol, 23 potash soap, 11 resinate of sodium, 33 formaldehyde.

No. 2. 30 phenol, 20 magnesium soap, 10 resinate of sodium, 15 formaldehyde, 15 sugar.

No. 3. 33 phenol, 23 lead soap, 11 resinate of magnesium, 33 formaldehyde, 8 cellulose.

No. 4. 30 phenol, 20 calcium soap, 10 resinate of potassium, 30 formaldehyde, 10 glue or gelatin.

It is to be understood that other proportions are possible. It is, however, necessary to employ the "soaps" to be employed in considerable quantities, the minimum being more than one-fifth of the equimolecular quantity of the phenol or its homologues which is employed.

I claim:—

The process of manufacturing a solid, elastic substance, which comprises reacting on a hydroxy derivative of an aromatic body with a soap in quantity more than one-fifth of the equimolecular quantity of said body, with sufficient heat to cause reaction and reacting on the resulting product with an aldehyde also in the presence of heat sufficient to produce a condensation product, and continuing the heating until the product thickens.

In testimony whereof I have signed my name to this specification, in the presence of two subscribing witnesses.

THEODOR SETH WENNAGEL.

Witnesses:
G. BURT BRANDER,
AUGUST MÖLLER.